United States Patent [19]

Perroud et al.

[11] Patent Number: 5,020,730

[45] Date of Patent: Jun. 4, 1991

[54] AUTOMATIC IRRIGATION MACHINE INCLUDING A DRUM DRIVEN BY A HYDRAULIC ACTUATOR, AND A COMPUTER FOR REGULATING THE ACTUATOR RATE

[75] Inventors: Bruno G. Perroud, Toulouse; Claude J. Rouquayrol, Roujan; Jean C. Guilhem, Paulhan, all of France

[73] Assignee: Irrifrance-Cofadsi, Paulhan, France

[21] Appl. No.: 484,121

[22] Filed: Feb. 22, 1990

[30] Foreign Application Priority Data

Feb. 24, 1989 [FR] France ............................. 89 02626

[51] Int. Cl.⁵ ..................... A01G 25/16; A01G 25/09; A01G 25/00
[52] U.S. Cl. ....................................... 239/745; 239/63
[58] Field of Search ..................... 239/745, 736, 70, 69

[56] References Cited

U.S. PATENT DOCUMENTS 4,445,643  5/1984  Thorsby et al. .
4,488,683  12/1984  Chiel .

FOREIGN PATENT DOCUMENTS 3049436  10/1981  Fed. Rep. of Germany .

Primary Examiner—Andres Kashnikow
Assistant Examiner—Lesley D. Morris
Attorney, Agent, or Firm—Ladas & Parry

[57] ABSTRACT

A machine in accordance with the invention includes a sprinkler gun (3) placed at the end of a hose (1) which is wound onto a drum (2) rotated by a flexible actuator (12) which actuates a rocker arm (13) carrying a finger (15) co-operating with regularly spaced-apart holes situated in a ring (31). The machine includes a computer (18). The machine also includes a sensor (30) for sensing angular displacement of the drum and situated in the proximity of the ring (31). The machine also includes a pressure sensor (40) at the water inlet to the machine. The computer is programmed to calculate the ideal speed of displacement of the sprinkler gun (3) as a function of the depth of water to be delivered and of the water flow rate which it calculates on the basis of the pressure of which is measured, with the computer also being programmed to calculate the ideal duration of an actuator cycle. The invention is applicable to constructing automatic irrigation machines enabling several different depths of water to be delivered during the course of a single irrigation cycle.

13 Claims, 5 Drawing Sheets

AUTOMATIC IRRIGATION MACHINE INCLUDING A DRUM DRIVEN BY A HYDRAULIC ACTUATOR, AND A COMPUTER FOR REGULATING THE ACTUATOR RATE

DESCRIPTION

The present invention relates to an automatic irrigation machine including a drum driven by a hydraulic actuator and a computer which regulates the actuator rate.

The technical field of the invention is the construction of automatic irrigation machines.

BACKGROUND OF THE INVENTION

Irrigation machines are known which include a flexible hose with a moving sprinkler apparatus mounted at the end thereof, e.g. a sprinkler boom or a water cannon mounted on a carriage.

The hose is wound onto a horizontal axis drum carried by a chassis suitable for coupling behind a tractor. The drum is rotated by a turbine or by a hydraulic actuator powered by the irrigation water.

French patent application FR-2.442.007 (Rosenqvist) describes an automatic irrigation machine in which the drum is driven by a turbine.

This machine includes a tachometric dynamo which delivers a signal proportional to the speed of rotation of the turbine and which is applied to a regulator that keeps this speed constant.

This regulation does not take account of variations in flow rate and cannot be used to vary the quantity of water during irrigation.

Austrian patent AT-B-384.346 (Bauer) describes an automatic irrigation machine comprising a drum rotated by a turbine which also, by means of a chain transmission, serves to drive a toothed wheel which actuates a switch that transmits pulses to a computer which calculates the speed of displacement of the sprinkler apparatus and which adjusts the speed of rotation of the turbine to keep the speed of displacement of the sprinkler apparatus constant.

The speed regulation described in that document does not take account of variations in the water flow rate and does not make it possible to adjust the amount of water delivered.

Automatic irrigation machines are also known in which the drum is rotated by an actuator, in particular a deformable actuator constituted by a cylindrical bellows made of elastomer, which actuator causes a rocker arm to reciprocate with the free end of the arm carrying a finger or pawl which co-operates with holes or notches or teeth that are regularly spaced apart around the periphery of the drum.

In machines of this prior type, water is admitted into the actuator and is delivered therefrom under the control of a distributor valve or "water rocker" which is mechanically controlled by abutments carried by a rod which is fixed to the rocker arm. This type of control enables a constant speed of rotation to be obtained or else a speed of rotation which varies as a function of the number of turns of hose wound on the drum in order to maintain the linear speed of displacement of the sprinkler apparatus constant.

The object of the present invention is to provide improved machines of this type making it possible to deliver a predetermined quantity of water regardless of variations in the flow rate of the water delivered by the sprinkler apparatus, and making it possible, in particular, to predetermine the quantity of water that is to be delivered and to make it very easy to vary this quantity as a function of weather conditions, of the nature of the terrain or the crop, and even to make it possible to deliver several different quantities of water during a single irrigation cycle.

When the sprinkler apparatus is of the type having a pivoting gun, an object of the present invention is to provide a machine which makes it easy to correct for sprinkling shortfall at the beginning and at the end of an irrigated strip by increasing the quantity of water delivered to these two ends.

A machine in accordance with the invention is of the conventional type including a drum which is rotated by a deformable actuator which causes a rocker arm to reciprocate, the free end of the arm carrying a finger which co-operates with holes that are regularly spaced apart around a ring which is concentric with said drum.

SUMMARY OF THE INVENTION

The objects of the invention are achieved by means of a machine of this type including a computer provided with a memory and with a keyboard, a first angular displacement sensor for sensing angular displacement of the drum and situated in the proximity of said ring to deliver a pulse to the computer each time one of said holes goes past it, and a water sensor which delivers a signal to the computer proportional to the water pressure or the water flow rate at the inlet to the machine, said computer being programmed to calculate on a continuous basis a theoretical winding speed for delivering a predetermined depth of water all along a strip of ground while taking account of the instantaneous flow rate as measured or calculated on the basis of the inlet pressure, and for calculating, firstly the length of hose wound in during each go-and-return cycle of the actuator as a function of the number of layers of hose already wound on the drum, and secondly the ideal go-and-return cycle time of the actuator corresponding to said ideal speed, with the computer regulating the duration of the go-and-return cycles of said actuator so that they are constantly equal to said ideal duration.

A machine of the invention includes a three-port hydraulic distributor valve having an inlet port connected to a water inlet pipe of said machine, an outlet port connected to the opening of said deformable actuator, and a discharge port, said hydraulic distributor including a valve member which is connected by a rod to a deformable membrane dividing a control chamber into a top compartment and a bottom compartment which is in communication with said inlet port, the machine also including an electrically-controlled bistable pilot valve controlled by pulses generated by the said computer, said electrically-controlled valve being a three-port valve having: two first ports which are connected respectively to each of the two compartments of said chamber, and an exhaust, third port, and said computer controlling the beginning of a new cycle of said actuator by applying a pulse to the electrically controlled valve causing it to take up a first stable position in which its first two ports are in communication with each other.

For a machine including a water sensor placed at the inlet to the machine to sense water pressure, said computer is programmed to calculate the head losses in the machine and in the hose as a function of the total length of hose and of the paid-out length thereof, in order to calculate the water pressure at the nozzle of the sprinkler apparatus, and to calculate the water flow rate as a function of said pressure at the nozzle and of the geometrical characteristics of the nozzle of the sprinkler apparatus, and also to calculate the range of a pivoting sprinkler gun.

Advantageously, a machine of the invention includes a second angular displacement sensor for sensing angular displacement of the drum and delivering a pulse to said computer each time a metal stud goes past the second sensor, said metal studs being mounted in uniform distribution around the periphery of a disk fixed to the shaft of said drum, the number of said studs being equal to the number of holes or to an integer multiple or submultiple thereof, and the computer being programmed to calculate the total length of hose actually wound-in since the beginning of an irrigation cycle on the basis of said pulses, and to compare periodically the ideal length which would have been wound in on the basis of the calculated ideal speeds, and if the real length is greater than the ideal length by a quantity which is greater than a threshold, the computer puts the machine on standby until the ideal length reaches the real length, whereas if the real length is less than the ideal length by a quantity greater than a determined threshold, the computer reduces the ideal cycle duration until the lateness has been absorbed.

The invention provides novel irrigation machines making it possible to irrigate a strip of ground automatically while delivering a constant depth of water in spite of variations in the water flow rate through the sprinkler apparatus due to pressure variations, and taking account of the number of layers of turn wound on the drum.

A machine of the invention may be used for programming different depths of water along a strip being irrigated as a function of the paid-out length of hose, which length is calculated from the signals delivered by the first angular displacement sensor of the drum.

A machine of the invention fitted with a pivoting gun can be used, in particular, for programming greater depths of water to be delivered at the beginning and at the end of a strip in order to compensate for the shortfall inherent to using a pivoting gun.

A machine of the invention can be used to program a maximum duration of irrigation such that the user can be certain that the irrigation of a strip of ground will be completed by a predetermined time, and therefore knows at what time it is possible to go and move the machine.

A machine of the invention can also be used to fix a minimum quantity of water and the computer can be programmed to give priority either to the maximum length of time or else to the minimum quantity of water.

BRIEF DESCRIPTION OF THE DRAWINGS

The following description refers to the accompanying drawings which show a non-limiting embodiment of an automatic irrigation machine of the invention. In the drawings.

MORE DETAILED DESCRIPTION

Figure 1:
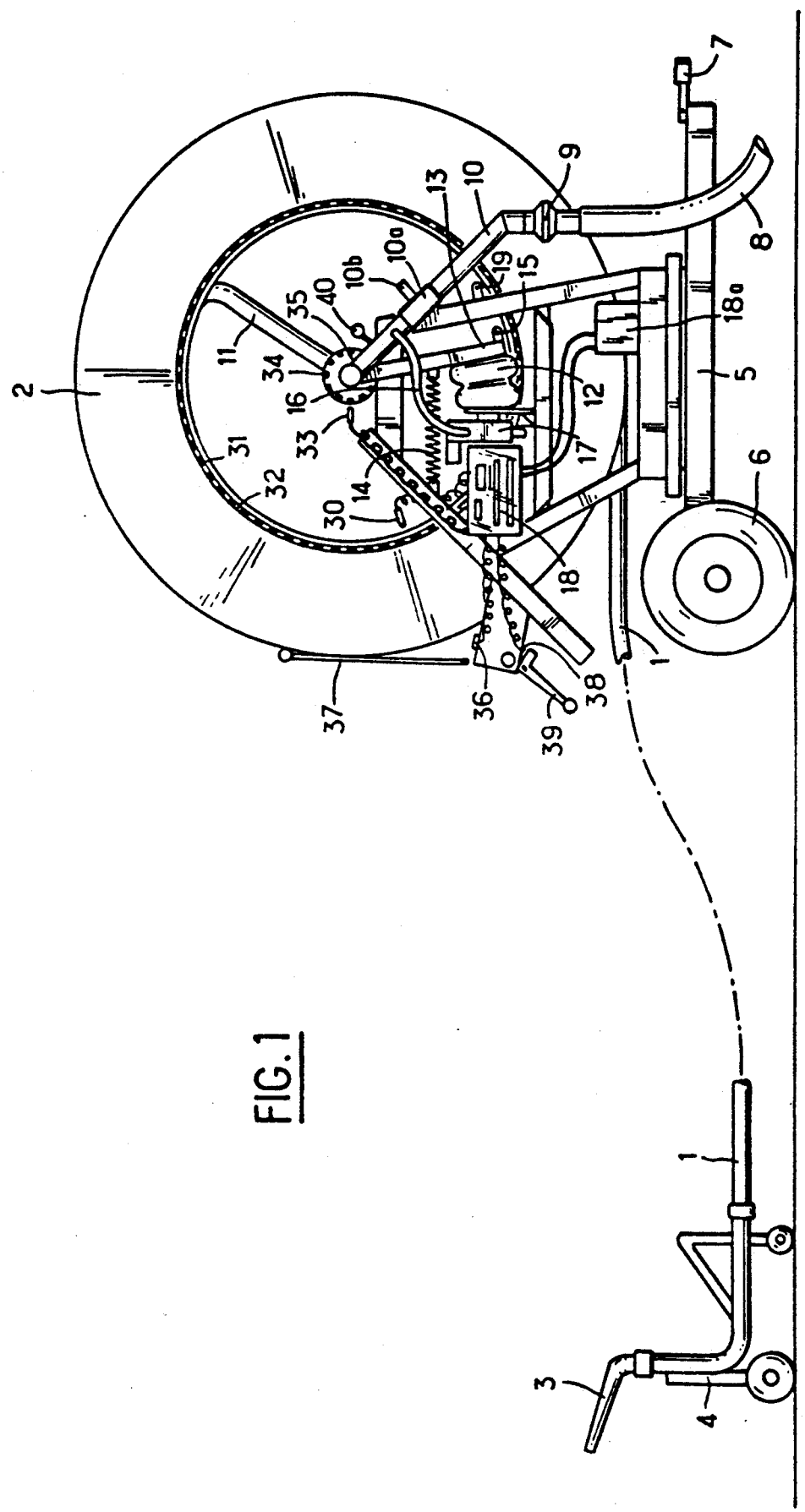
FIG. 1 is an overall elevation view of a machine of the invention.

FIG. 1 shows an irrigation machine of the invention.

This machine comprises a flexible irrigation hose 1 wound on a horizontal axis drum 2 and fitted at its end with a sprinkler member, e.g. a gun 3 mounted on a carriage 4, but which could equally well be a transverse perforated boom.

In any event, the sprinkler member irrigates a strip of ground E, and its width varies as a function of pressure when using a gun.

The drum 2 is mounted on a chassis 5 provided with wheels 6 and a tow bar 7 for hitching behind a tractor.

The irrigation water supplied to the machine arrives via a hose 8 which is connected to an inlet connection 9 placed at the end of a tube 10 which is connected via a rotary joint on the hollow shaft of the drum.

A tube 11 connects the hollow shaft to the end of the hose 1 wound on the drum.

At the beginning of a sprinkling cycle for a strip of ground, the chassis 5 is placed at one end of the strip and a determined length of the hose 1 is paid out, e.g. by pulling it using a tractor, thereby bringing the sprinkler member 3 to the other end of the strip of ground.

The water inlet is then turned on. The drum 2 is rotated very slowly by a hydraulic motor driven by the irrigation water.

The rotation of the drum winds in the hose 1, thereby automatically returning the sprinkler member 3 towards the drum while irrigating a strip of ground whose width E is equal to twice the range of a sprinkler gun 3 and whose length is equal to or slightly greater than the paid-out length of hose.

FIG. 1 shows a machine fitted with a hydraulic motor constituted by a single action flexible actuator 12 which is a bellows-shaped deformable cylinder of elastomer.

One end of the actuator bears against a fixed abutment on the chassis 5.

Its other end bears against a moving arm 13 having one end pivoting about a hinge. The moving arm is urged towards its position by a spring 14.

The free end of the moving arm, i.e. its end furthest from the hinge, carries a finger or pawl 15 which engages in holes or notches that are regularly spaced apart around a ring integral with the drum and at the periphery thereof.

The irrigation water feeding the actuator is taken off via a duct 16 connected to the tube 10 and passes into a hydraulic distributor valve 17 which is hydraulically controlled by an electrically-controlled valve itself controlled by pulses of current, and which is a three-port bistable pilot valve controlled by pulses delivered under the control of a microcomputer 18.

The distributor valve and the electrically-controlled valve are described in greater detail with reference to FIG. 2.

The electrically-controlled valve and the computer are powered from a storage battery 18a.

When water is delivered to the actuator 12, it inflates, and the finger 15 penetrates into one of the holes situated at the periphery of the drum and rotates the drum anticlockwise in the figure.

When the actuator is emptied, it deflates and the moving arm is returned to its starting position by the spring 16.

During the return motion of the moving arm, the finger 12 automatically retracts and a non-return pawl 19 which engages in one of the notches in the periphery of the drum prevents the drum from rotating backwards.

Figure 2:
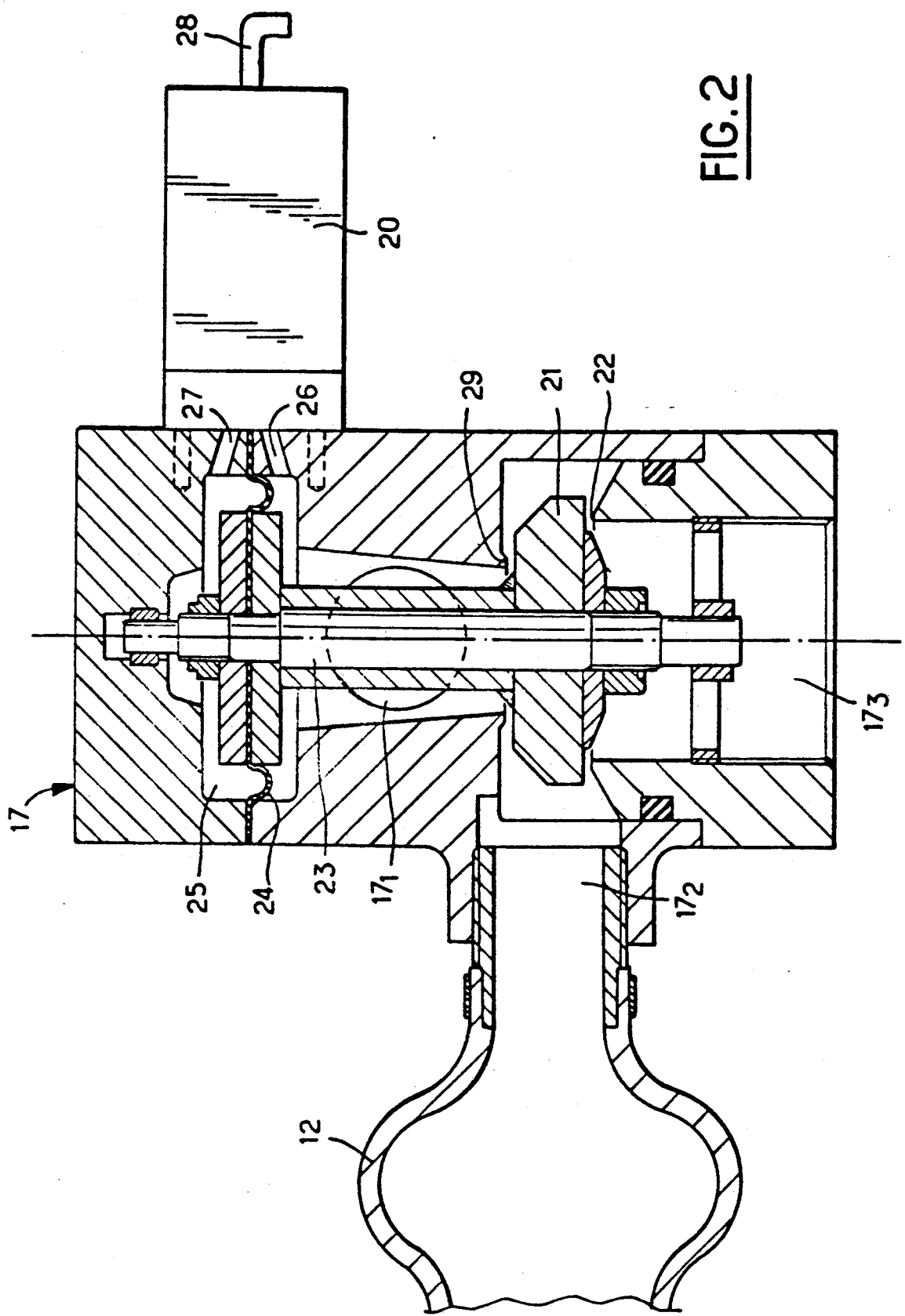
FIG. 2 is an axial section through a hydraulic distributor valve fitted with an electrically-controlled bistable pilot valve which controls the delivery of water to the deformable actuator, and the discharging of water therefrom.

FIG. 2 is an axial section through the hydraulic distributor valve 17.

This figure shows one end of the flexible actuator 12 and the three-port electrically-controlled valve 20 which hydraulically controls the distributor valve.

The distributor valve 17 has three ports: a water inlet $17_1$ connected to the duct 16, a water outlet port $17_2$ connected to the flexible actuator, and a discharge port $17_3$.

It includes a valve member 21 which co-operates with a seat 22 situated at the inlet to the discharge port $17_3$.

The valve member 21 is mounted on a rod 23 which connects it to a deformable control membrane 24 that divides a control chamber 25 into two compartments. Each of the compartments of the chamber 25 communicates with a respective small duct 26 or 27, which ducts are connected to two of the ports of the electrically-controlled valve 20. The valve 20 has a third port which communicates with a purge orifice 28.

Operation is as follows.

At the beginning of a cycle, the central computer sends a pulse to the valve 20 which puts its ducts 26 and 27 into communication. The water pressure which arrives via the inlet port $17_1$ is then exerted on both faces of the membrane 24. The water pressure which also acts on the top face of the valve member 21 closes it. The water penetrates into the actuator which inflates, and the rocking arm drives the drum.

After a certain length of time as determined by the central computer in a manner explained below, the computer sends a new pulse to the valve 20 which switches to its second stable position in which its duct 27 is in communication with the purge port 28. The top compartment of the control chamber 25 empties. The wetted area of the membrane 24 is greater than that of the valve member 21 so the difference between the thrust of water on the membrane and on the valve member causes the valve member to be pushed up against the seat 29.

Water inlet port $17_1$ is then cut off. However, outlet port $17_2$ and discharge port $17_3$ are in communication and the actuator 12 empties, thereby deflating under the effect of the return spring 14.

Automatic irrigation machines of the type described above are already known, except that they are not provided with a computer. In such prior machines, the inflation and deflation cycles of the deformable actuator are controlled by end-of-stroke contacts actuated by the rocking lever, such that it is not easy to vary the duration of actuator cycles and thus vary the speed of rotation of the drum in order to take account of variations in the water flow rate through the sprinkler gun 3, which flow rate depends on the diameter of the gun orifice, and also on variations in the supply pressure at the inlets to the machine and on variations in head loss as a function of the paid-out length of hose, which length varies throughout an irrigation cycle.

In prior machines, it is not possible to vary the speed of rotation of the drum in order to regulate the quantity of water delivered, i.e. the height of water delivered, nor is it possible to vary the total time taken for irrigation.

A machine of the invention is fitted with a microcomputer mounted on the machine, together with means serving to vary the durations of the cycles of the deformable actuator and thus also to vary the speed of rotation of the drum as a function of numerous parameters, in particular: variations in water pressure; the various quantities of water that are to be delivered; and the maximum irrigation time that is to be complied with. These means also make it possible to vary the quantity of water delivered along a strip of ground being irrigated as a function of different crops or as a function of the varying nature of the soil.

A machine of the invention includes an angular displacement sensor 30 for sensing the angular displacement of the drum.

Figure 3:
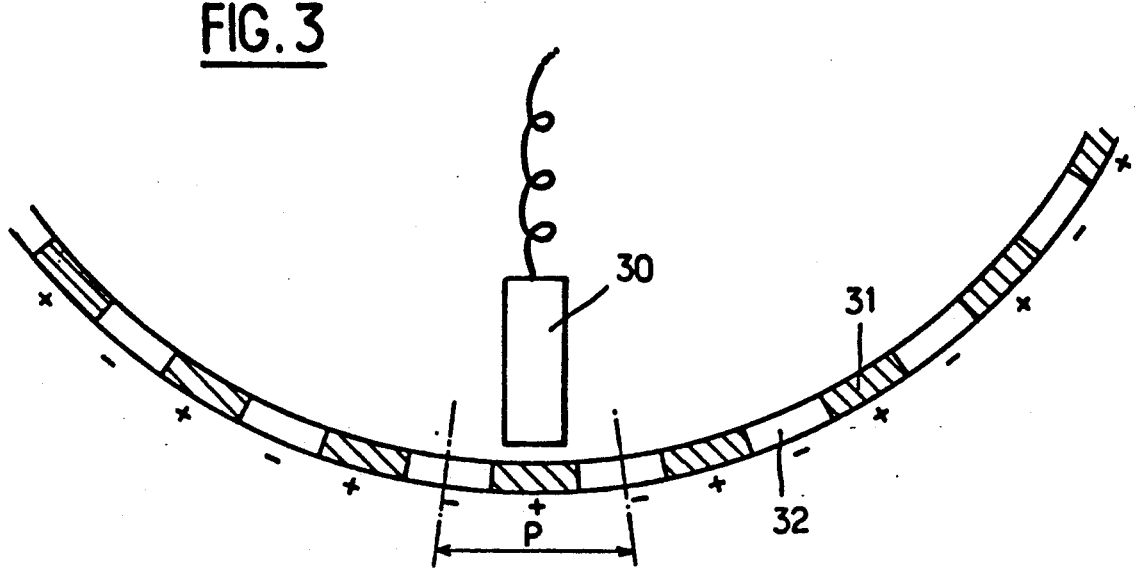
FIG. 3 is a fragmentary view showing a portion of a ring fixed to the drum, together with an annular displacement sensor.

FIG. 3 shows a portion of a metal ring 31 fixed concentrically to the drum 2 and including a plurality of regularly spaced-apart holes or notches 32. The figure shows a displacement sensor 30 which, for example, is a detector for detecting a mass of metal placed in the proximity of the ring 31 and delivering a + signal when facing a gap between two holes and a − signal when facing a hole 32.

Advantageously, the holes 32 are the same as those which engage the finger 15 carried by the moving arm 13. These holes match the shape of the finger. The gaps between the holes are preferably of substantially the same length as the holes, and the pitch, i.e. the distance between the axes of two adjacent holes, is less than half the stroke of the finger 15.

A machine of the invention includes a second angular displacement sensor 33 which, advantageously, is identical to the sensor 30 and which generates pulses corresponding to equidistant metal studs 34 carried by a disk 35 fixed to the shaft of the drum 2 going past the sensor 33. The number of studs 34 is either equal to the number of holes 32, or else is equal to an integer multiple or submultiple thereof.

The machine also includes a switch 36 whose contact is actuated by a hinged arm 37 which bears against the turns of holes wound on the drum. In the event of the turns being wound onto the drum crossing over one another inappropriately, the arm 37 actuates the switch 36 which applies a signal to the computer 18 which in turn automatically stops the machine.

In conventional manner, the machine also includes a switch 38 which is actuated by a lever 39. When the carriage 4 carrying the sprinkler gun 3 reaches the end of its stroke, it actuates the lever 39 and the switch 38 sends a signal to the computer.

The computer includes a keyboard enabling data to be entered into the computer.

When the computer is installed on a given machine, the manufacturer knows the diameter d and the total length L of the hose 1, and also the diameter D and the width e of the drum 2 and the number N of holes 32 provided in the ring 31, and the manufacturer enters this data into the computer memory.

The computer 18 includes a program for calculating the length of hose wound on the drum 2, taking account of the extent to which the hose is ovalized, i.e. of the oval shape which the hose takes up when wound onto the drum.

Figure 4:
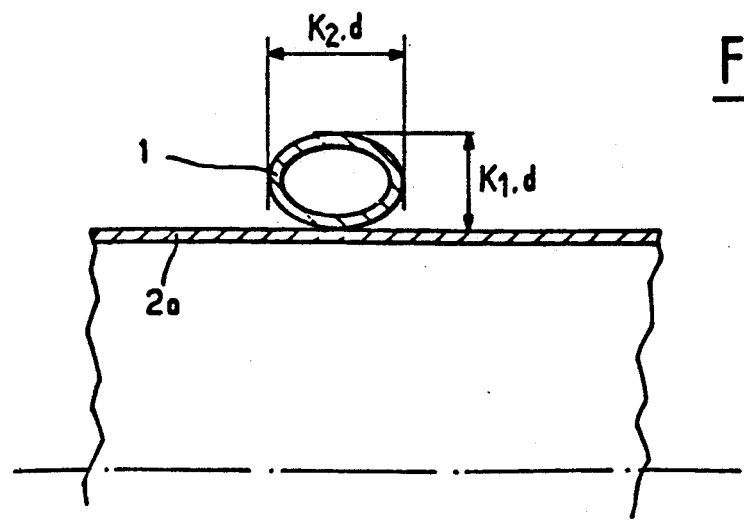
FIG. 4 is a view of a flattened tube wound on the drum.

The hose flattens, such that its thickness in the radial direction becomes equal to d.K1 and in the transverse direction to d.K2, as can be seen in FIG. 4 which is a section through one turn of the hose 1 wound on the drum portion 2a of the drum 2.

K1 and K2 are constant coefficients that are known for a hose of determined diameter, thickness, and nature, or which can be measured.

The number of turns in each layer is the same and it is equal to:

$$e/d.K2$$

The number of holes 32 corresponding to each layer is likewise the same and it is equal to:

$$N1 = Ne/d.K2$$

The mean diameter of the turns of the first layer is equal to $D+d.K1$ and the total length L1 of hose wound on the first layer is therefore equal to:

$$L1 = (D+d.K1).\pi.e/d.K2$$

For the first layer, each drive step p of the drum corresponds to a length of wound hose equal to:

$$L1/N1 = (D+d.K1).\pi./N$$

The mean diameter of the turns of the second layer is equal to $D+3d.K1$.

The total length L2 of hose wound on the second layer is equal to:

$$L2 = (D+3d.K1).\pi.e/d.K2$$

For the second layer, the length of hose wound onto the drum for each drive step thereof is equal to:

$$(D+3d.K1).\pi/N$$

Similarly, for the third layer the total length of the layer is:

$$L3 = (D+5d.K1).\pi.e/d.K2$$

and the length of hose wound on during each drive step applied to the drum is equal to:

$$(D+5d.K1).\pi/N$$

Given the total length L of hose, and the length of each layer, the computer determines the number of winding layers and the total length of the last layer which is incomplete.

Thus, the computer is continuously aware of the number of holes 32 which have gone past the sensor 30 because of the pulses which are transmitted to the computer by the sensor, and using the calculation program explained above, the computer calculates at any instant the wound-in length of hose, and by taking the difference with the total length thereof it establishes the paid-out length of hose.

The diameter d of the hose and the total length L may vary during the lifetime of a machine, each time the user replaces the hose.

The user may then reprogram the machine or else may have it reprogrammed, merely by replacing the values of d and of L as initially stored by means of new values, with the calculating program remaining unaltered.

It is mentioned above that the second sensor 33 detects metal studs 34 going past it, with the number of studs being an integer multiple or submultiple of the number of holes 32.

There is thus a direct relationship between the number of pulses generated by the two sensors, and for each layer of winding, the computer also calculates the length of hose which is wound between two successive pulses generated by the sensor 33.

The computer 18 includes a time base constituted by an electronic clock, thereby enabling it to establish a relationship between space and time, i.e. to calculate winding speeds by dividing the length wound between two successive pulses by the time which elapses between said two pulses.

Given the length of hose paid out at any instant, the computer can calculate the ideal winding rate for satisfying various criteria, e.g. for maintaining the quantity of water delivered constant in spite of variations in water pressure at the sprinkler gun, or for varying the quantity of irrigation water during irrigation of a strip of ground. The computer then compares the real winding speed as measured with the ideal speed and it acts automatically on the electrically-controlled valve 20 in order to change the mean winding speed.

The stroke of the actuator 12 and the number N of holes 32 are determined in such a manner that each stroke of the actuator corresponds to an integer number of steps between holes 32.

During each actuator cycle, the actuator is maintained for a certain length of time in the deflated position, with the drum then being stationary and the sensor 30 facing a gap 31 between two holes and delivering a + signal.

If it is desired that the drum should rotate through a single step during each actuator cycle, it is necessary for the actuator stroke to be greater than one step and less than two steps.

After controlling the valve 20 to inflate the actuator, the computer records the sequence of signals delivered by the sensor 30 and it instructs the valve 20 to switch over after it has received a +, −, +, − sequence of signals from the sensor 30.

The actuator then deflates and the drum is locked by the non-return pawl 19 which is placed in such a manner that the sensor 30 then lies in front of the following gap 31 so that it delivers a + signal.

If it is desired that the drum should turn through two steps during each actuator cycle, the computer is programmed to switch over the electrically controlled valve after receiving a −, +, −, +, − sequence of signals from the sensor 30.

Given the selected number of steps corresponding to each actuator stroke, the computer can calculate the lengths of hose wound in for each stroke of the actuator by using the calculation program explained above, which program gives the length wound in for each step, said length being multiplied by the number of steps travelled during each stroke of the actuator.

The computer calculates the ideal winding speed Vt on the basis of data entered therein from the keyboard at the beginning of an irrigation cycle.

On the basis of this ideal speed Vt, and on the basis of the various different lengths of hose L1, L2, L3, etc. that are wound in during each stroke of the actuator on each layer, the computer calculates the ideal durations T for each actuator cycle corresponding to a particular layer of turns wound on the drum.

The time required for an actuator go-and-return stroke is determined by construction parameters.

By construction, the shortest time is shorter than the ideal time T as calculated by the computer.

Each actuator operating cycle begins when the computer sends a pulse to the valve 20 to inflate the actuator.

The computer measures the time which elapses from said instant and it instructs the beginning of a new cycle only after the measured duration has reached the ideal time T.

Since the drum is driven in steps by the actuator, the computer does not act on the instantaneous speed of displacement of the sprinkler member, but on the duration of each actuator cycle, and this is equivalent to determining a mean speed of displacement for the sprinkler member.

The computer sums the pulses delivered by the second sensor 33 and on the basis of these pulses it calculates the real total length of hose wound in since the beginning of an irrigation cycle by using the calculation program described above, thereby enabling it to know the corresponding length of wound-in hose at each interval between two pulses, taking account of the number of layers already wound on the drum.

Further, on the basis of the ideal displacement speed for the sprinkler member as calculated by the computer, and the time elapsed since the beginning of an irrigation cycle, the computer calculates on a permanent basis the ideal length that should have been covered by the sprinkler member.

Periodically the computer compares these two lengths. If the real length exceeds the ideal length by more than a determined threshold amount, then the computer puts the machine on standby until the ideal length which increases with elasped time comes up to the real length. If the real length is less than the ideal length by an amount which is greater than a determined threshold, then the computer increases the frequency of actuator operating cycles, i.e. it slightly reduces the ideal cycle duration T until the lateness has been absorbed.

If the difference cannot be absorbed and reaches a predetermined length, the computer automatically switches off the water feed by closing a hydraulic valve 10a placed in the duct 10.

The valve 10a is controlled by a current pulse valve 10b analogous to the valve 20 and under the control of current pulses from the computer.

The function of the second sensor 33 associated with the studs 34 carried by the disk 35 is to provide overall control of the regulation of actuator cycle durations and to correct it if necessary.

A machine of the invention also includes either a flowmeter placed on the water inlet to measure the water flow rate and deliver the measurement to the computer, or else a pressure sensor 40 which measures the water pressure P at the inlet to the machine.

With a pressure sensor, the computer calculates the flow rate Q on the basis of the measured pressure.

The user inputs the diameter $\phi$ of the nozzle of the spray apparatus 3 into the computer.

Let the pressure of the water arriving at the nozzle be P1. The computer calculates the instantaneous flow rate Q by applying the formula:

$$Q = K3 \cdot \phi^2 \sqrt{P1}$$

where K3 is a constant coefficient which depends on the shape of the nozzle and which is input into the computer.

The pressure P1 at the nozzle depends on the head loss $\delta P1$ in the machine, on the head loss $\delta P2$ in the hose, and on the pressure P at the inlet, in accordance with the equation:

$$P = \delta P1 + \delta P2 + P1$$

The computer calculates the head losses as a function of the flow rate Q and of the diameter d of the hose using a calculation program based on the following formulas:

$$\delta P1 = Q^{1.75} \cdot K4$$

$$\delta P2 = Q^{1.75} \cdot d^{4.75}(0.5L - 0.1L1)$$

In which formulas K4 is a constant coefficient stored in the machine, d is the inside diameter of the hose 1, L1 is the paid-out length of hose, and L is the total length of hose.

Finally, the computer calculates the flow rate Q as a function of the inlet pressure P by applying the formula:

$$P = P1 + P1 + \delta P2$$

i.e.:

$$P = (Q/K3 \cdot \phi^2)^2 + K4 \cdot Q^{1.75} + [Q^{1.75} d^{4.75} \cdot (0.5L - 0.1L1)]$$

On the basis of these calculations, the computer can display on a screen the pressure P1 at the nozzle of the sprinkler apparatus as well as the flow rate Q therethrough.

For a user of an automatic irrigation machine, there are two parameters which are essential: firstly there is the quantity of water delivered, i.e. the depth of water per unit area irrigated, and secondly there is the total duration of an irrigation cycle since the user often only has water available during a determined period of time, or else the user desires to move the machine to a different parcel of land at a particular time.

Let Vt be the ideal speed of displacement for the sprinkler apparatus 3, expressed in meters per hour (m/h).

Let h be the depth of water distributed in mm.

Let Q be the flow rate through the sprinkler apparatus in $m^3/h$.

Let E be the width of the associated strip of land, i.e. twice the range of a pivoting gun.

These parameters are related by the equation:

$$h = Q/Vt \cdot E$$

Assuming that E and Q are constants, a constant speed of carriage displacement V can be calculated in order to obtain a given depth h. Known irrigation apparatuses generally operate on this principle, and they include means which vary the speed of the drum 2 so that the speed Vt remains constant and equal to a predetermined value.

In this case, if the flow rate Q changes during an irrigation operation, the speed does not change so it is the depth of irrigation h which changes.

The machine of the invention makes it possible to vary the speed Vt, i.e. the duration of actuator cycles, as a function of variations in the flow rate Q as measured by a flow meter or as calculated on the basis of the measured water pressure P at the inlet to the machine, as explained above, thereby enabling the quantity of water h to remain constant in spite of variations in flow rate which are due either to variations in the pressure of the water at the inlet to the machine or else to variations in head loss along the hose as a function of the paid-out length of hose.

In addition, a machine of the invention also makes it possible to vary the quantity of water h delivered as a function of the position of the sprinkler apparatus along a strip of ground being irrigated.

The computer which counts the pulses delivered by the sensor 30 continuously calculates the paid-out length of hose and therefore knows the position of the sprinkler apparatus. The computer also contains a program enabling the user, prior to beginning an irrigation operation, to key in lengths measured from the drum together with quantities of water to be delivered, which quantities may vary as a function of the nature of the crop or of changes in the ground, for example.

When the sprinkler apparatus is a pivoting gun, the user may program a larger quantity of water to be delivered over a certain length at the beginning and at the end of the parcel of land in order to compensate for the irrigation shortfall.

Figure 5:
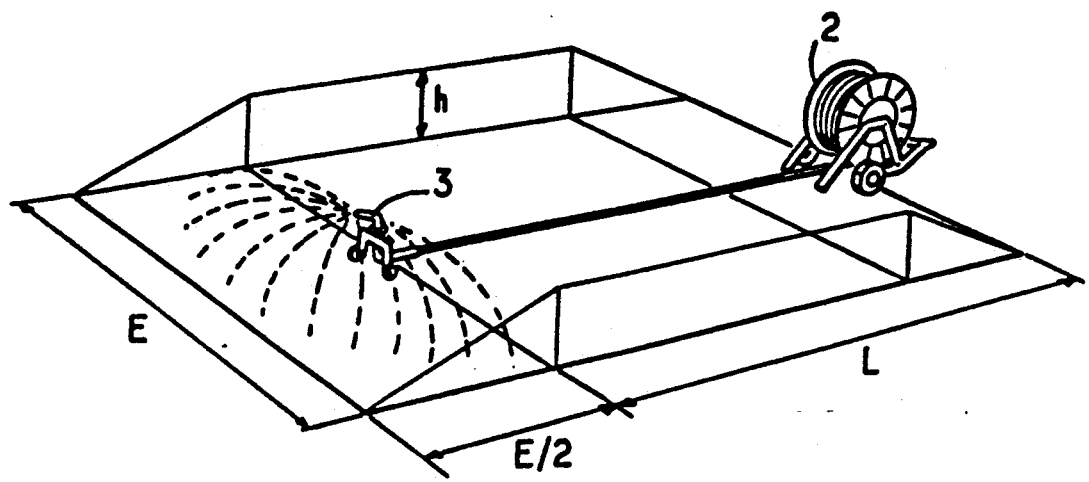
FIGS. 5 and 6 are views showing a machine in position at the beginning of irrigating a strip.

FIG. 5 shows a machine of the invention having a drum 2 and a sprinkler gun 3 at the beginning of irrigating a strip of land of length L+E/2 and of width E, with the range of the sprinkler gun being E/2.

At the beginning of irrigation, the paid-out length of hose is equal to L.

The left of the figure shows the depth of water h as delivered for a constant speed of gun displacement. In this case, the depth h is constant except at the two ends where over a length equal to E/2, it decreases progressively down to zero.

Figure 6:
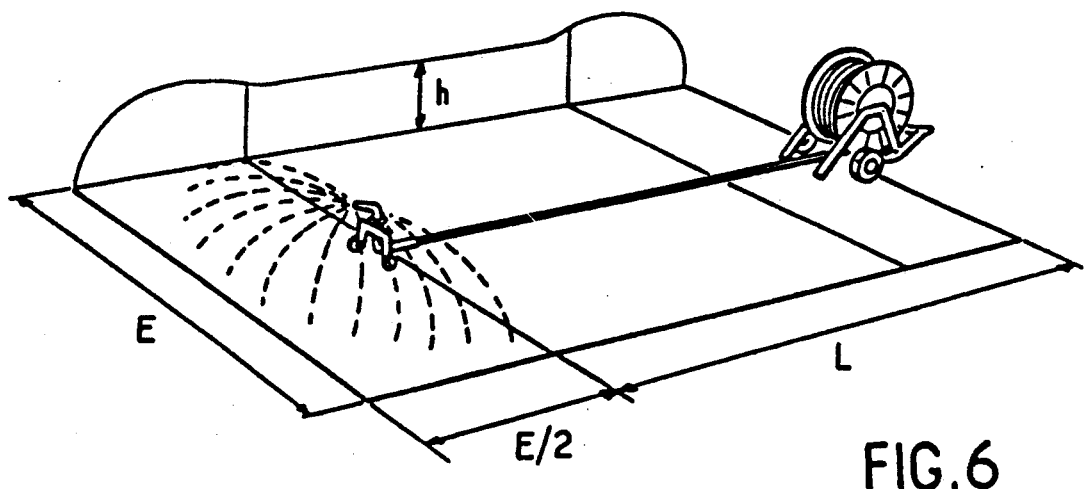

FIG. 6 shows the same strip of ground irrigated by a machine of the invention which makes it possible to program for a greater quantity of water h to be delivered at the beginning and at the end of the strip while the gun travels through a distance substantially equal to one-half its range.

For example, if L=200 m and E=40 m, and if it is desired to deliver three liters of water per square meter, i.e. a depth of 3 mm, then the computer is programmed to deliver 4 mm of water between 200 m and 180 m, after which it is to deliver 3 mm of water between 180 m and 20 m, and then to deliver 4 mm of water again during the last 20 m of its travel.

The curve shown on the lefthand portion of the figure shows that, in this case, a compensated quantity of water is delivered at both ends of the strip, thereby avoiding the conventional irrigation shortfall.

In addition to variations in the flow rate Q delivered by the sprinkler apparatus, account may also be taken of variations in the range E/2 of the sprinkler gun due to variations in the pressure P1 of the water at the nozzle of the sprinkler gun.

The computer is programmed to calculate the real maximum range Er using a formula of the form Er=P1.K5, where K5 is a constant coefficient depending on the nozzle diameter of the gun.

The values of the coefficient K5 or indeed values of the maximum range corresponding to a given pressure, are recorded in the computer memory for a series of nozzle diameters.

Figure 7:
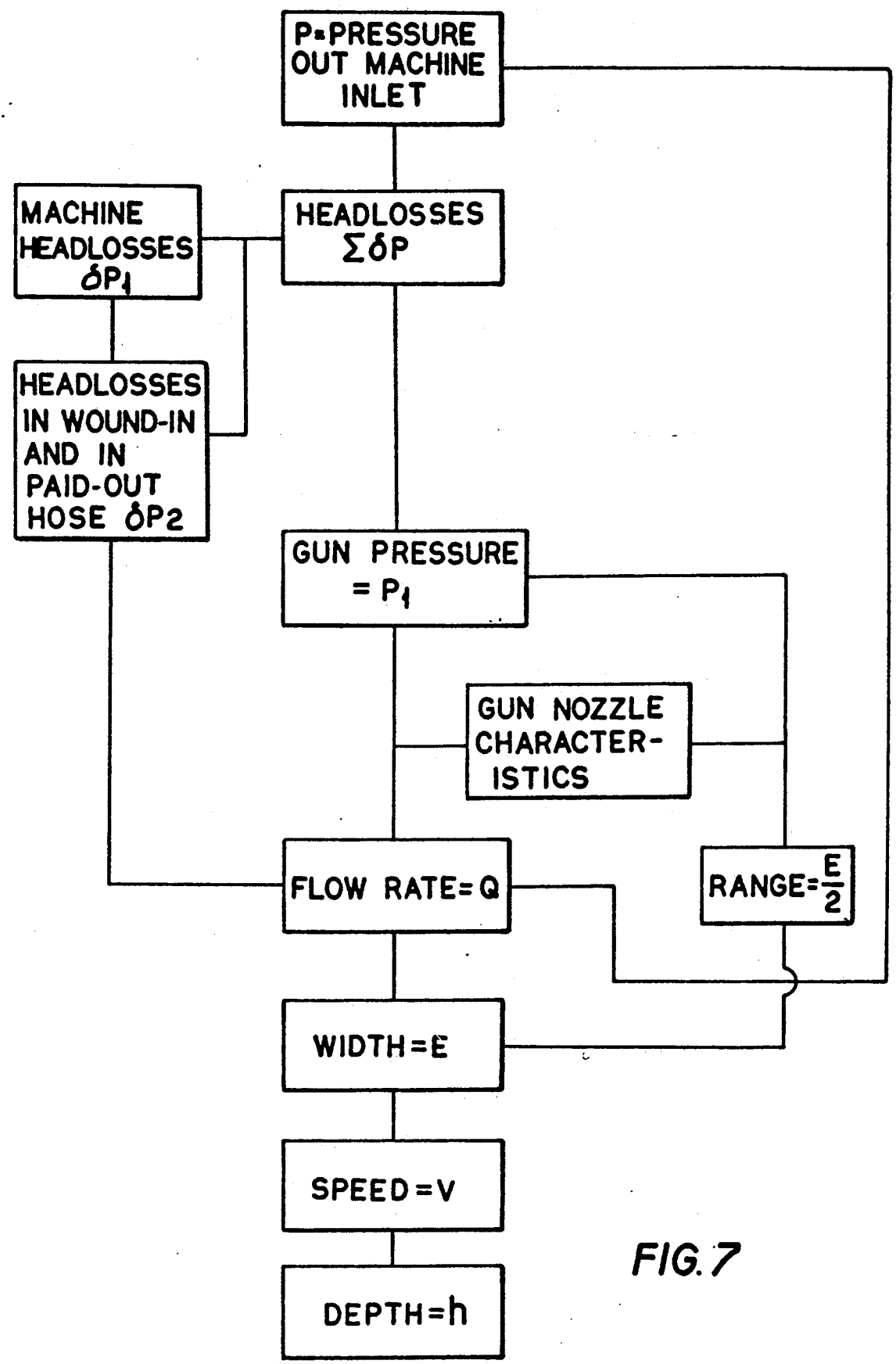
FIG. 7 is a summary table showing a flow chart of a portion of the computer program for calculating the theoretical speed $V_t$ at which the sprinkler apparatus should be displaced.

FIG. 7 is a table showing the data input into the computer and the sequencing of the operations performed thereby.

The pressure P at the inlet to the machine is measured and the computer calculates the head loss in the machine $\delta P1$, the head loss in the hose $\delta P2$, and the total head loss:

$$\Sigma\delta P = \delta P1 + \delta P2$$

on the basis of an ideal flow rate, and then it calculates the pressure P1 at the sprinkler gun by taking the difference.

On the basis of the nozzle characteristics recorded in the computer, it calculates the flow rate Q. Since head losses depend on flow rate, the new value of the flow Q is fed back into the formulas for calculating the head loss in order to arrive at a corrected value of flow rate.

When the machine also includes a flow rate sensor, the flow rate Q is conveyed to the computer by the sensor.

The computer calculates the range E/2 of the gun as a function of the pressure P1 at the gun and the nozzle characteristics, and it deduces the width E of the irrigated strip therefrom.

As a function of this calculated width E and of the requested quantity of water h as keyed into the computer, which may take up various different values h1, h2, . . . along a single strip during a single irrigation cycle, the computer calculates for each value of h, the corresponding ideal speed V by applying the formula:

$$Vt = Q/h.E$$

Since the drum 2 is driven in steps by an actuator, its speed is not a parameter which is convenient to use.

The computer calculates the ideal duration T of the actuator operating cycle on the basis of the length of hose wound in during each actuator cycle and on the basis of the speed it has already calculated. This ideal duration varies with the layer occupied by the hose wound onto the drum. It also varies with the parameters on which the ideal speed Vt varies, i.e. the desired depth of water and the pressure P at the inlet to the machine, both of which affect the flow rate Q, and thus the range of the gun.

The computer continuously compares the real duration of actuator operating cycles with the ideal set duration T that it has calculated, and it switches on the valve 20 whenever the real cycle duration reaches the ideal duration.

A machine of the invention can deliver a constant and substantially uniform quantity of water in spite of variations in water pressure.

It makes it possible to program the depth of water and to modify this depth, either over time as a function of seasonal variations, or else as a function of space, changing the delivered quantity depending on the nature of the crop or of the ground. It makes it possible to vary the quantity of water distributed along a single strip of irrigated ground.

The machine of the invention makes it possible to deliver a quantity of water which is independent of the influence of external constraints.

The quantity delivered is independent of variations in the pressure of water which are taken into account when calculating the reference speed. The mean speed of displacement of the sprinkler gun is imposed by the duration of actuator cycles.

There are no variations in speed due to variations in adherence of the terrain over which the carriage 4 moves or to variations due to stretching of the hose. Variations in the winding diameter of the hose on the drum are taken into account in the calculations.

The table of FIG. 7 represents a flow chart of subprograms for the calculations performed by the computer in order to calculate the speed V as a function of the pressure P measured at the inlet to the machine. In a variant, the machine may include a flow meter which measures the flow rate Q directly.

In this case, the computer calculates the pressure P1 at the gun on the basis of the measured flow rate and of the nozzle characteristics, by applying the formula:

$$P1 = (Q/K3.\phi^2)^2$$

after which it calculates the range E/2 of the gun, the width of the irrigated strip E, and the speed V.

A machine of the invention can record in its memory a maximum irrigation time, and the machine may be programmed so as to give priority to said maximum duration, so that the user is certain to be able to move the machine at a predetermined time, which can be very useful in practice.

Similarly, the machine of the invention may be programmed to guarantee a minimum irrigated strip width in order to prevent the margins of the strip being poorly irrigated in the event of a drop in pressure reducing the range of the gun.

In this case, a minimum pressure threshold at the sprinkler nozzle is recorded in the computer, and if this value is reached, then the computer controls the control valve 10b which closes the hydraulic valve 10a.

If the pressure rises back above the threshold, then the computer switches the valve 10b back on. The duration of the pause is then recorded by the computer which calculates a new ideal speed Vt for displacement of the sprinkler apparatus 3 so that the irrigation can be terminated within the time limit laid down.

Naturally, this new speed corresponds to a new quantity of water delivered which is less than that which was set initially. In this case, the maximum duration requirement takes priority over the initially set quantity of water.

However, the computer may be given limits. For example, a minimum quantity of water may be specified compatible with the maximum speed of displacement of the machine, i.e. with a minimum duration of actuator cycles.

So long as the ideal quantity of water calculated by the computer for complying with the predetermined irrigation time limit remains above the minimum quantity of water, then the machine gives priority to the irrigation time limit.

If the ideal quantity calculated by the computer drops below the minimum quantity, then the machine gives priority to the minimum quantity, in which case the time taken to perform the irrigation will exceed the maximum time limit as set initially.

The computer fitted to the machine of the invention may be connected by an interface circuit to a small radio transmitter for emitting an alarm signal. In this case, the user has a radio receiver. The transmitter may transmit a signal, for example to warn the user while the hose is being paid out that the hose has been fully paid out, thereby enabling the user to stop paying out the hose and avoid running the risk of pulling it off the drum.

The computer may be equipped with data input terminals on which measurement apparatuses may be connected. For example, a rain meter may be connected thereto for measuring the depth of rain that falls should rainfall occur during irrigation. The rain meter is fitted with a contact or with electrodes whose level is adjustable by the user of the machine. If this level is reached, then the contact closes and the computer receives a signal. The computer is then programmed to wind in the hose at maximum speed or to stop irrigation automatically.

Similarly, an anemometer may be connected to the input terminals in order to provide a signal when the wind speed exceeds a maximum threshold. On receiving this signal, the computer automatically stops irrigation in order to avoid the sprayed water being poorly distributed due to too high a wind speed.

FIG. 1 shows a machine fitted with a stop valve 10a enabling stopping and starting of the machine to be controlled automatically.

In a variant, the machine may be fitted with an identical hydraulic valve referred to as a discharge valve and connected to a channel open to the atmosphere. In this case, when the computer opens the discharge valve, irrigation is stopped and the pressure in the water distribution network fed by a pump drops. This pressure drop goes back to the pump where it acts on a pressure switch or sensor for automatically stopping the pumping station.

We claim:

1. An automatic irrigation machine of the type comprising a flexible irrigation hose feeding a sprinkler apparatus mounted on a carriage and wound onto a drum which is rotated by a deformable actuator that reciprocates a rocker arm carrying a finger at its free end which co-operates with holes regularly spaced apart on a ring concentric with said drum, the machine including a computer provided with a memory and with a keyboard, a first angular displacement sensor for sensing angular displacement of the drum and situated in the proximity of said ring to deliver a pulse to the computer each time one of said holes goes past it, and a water sensor which delivers a signal to the computer proportional to the water pressure or the water flow rate at the inlet to the machine, said computer being programmed to calculate on a continuous basis a theoretical winding speed for delivering a predetermined depth of water all along a strip of ground while taking account of the instantaneous flow rate as measured or calculated on the basis of the inlet pressure, and for calculating, firstly the length of hose wound in during each go-and-return cycle of the actuator as a function of the number of layers of hose already wound on the drum, and secondly the ideal go-and-return cycle time of the actuator corresponding to said ideal speed, with the computer regulating the duration of the go-and-return cycles of said actuator so that they are constantly equal to said ideal duration.

2. A machine according to claim 1, including a three-port hydraulic distributor valve having an inlet port connected to a water inlet pipe of said machine, an outlet port connected to the opening of said deformable actuator, and a discharge port, said hydraulic distributor including a valve member which is connected by a rod to a deformable membrane dividing a control chamber into a top compartment and a bottom compartment which is in communication with said inlet port, the machine also including an electrically-controlled bistable pilot valve controlled by pulses generated by the said computer, said electrically-controlled valve being a three-port valve having: two first ports which are connected respectively to each of the two compartments of said chamber, and an exhaust, third port, and said computer controlling the beginning of a new cycle of said actuator by applying a pulse to the electricallycontrolled valve causing it to take up a first stable position in which its first two ports are in communication with each other.

3. A machine according to claim 1, including a water sensor placed at the inlet to the machine to sense water pressure, wherein said computer is programmed to calculate the head losses in the machine and in the hose as a function of the total length of hose and of the paid-out length thereof, in order to calculate the water pressure at the nozzle of the sprinkler apparatus, and to calculate the water flow rate as a function of said pressure at the nozzle and of the geometrical characteristics of the nozzle of the sprinkler apparatus, and also to calculate the range of a pivoting sprinkler gun.

4. A machine according to claim 2, in which the computer is programmed to send a pulse to said electrically-controlled valve to put the port connected to the top compartment of the control chamber of the hydraulic distributor valve into communication with the discharge port, thereby causing said deformable actuator to be emptied and thus beginning the return motion of the actuator, said signal being applied after the computer has received a sequence of + and − signals from said second sensor determined as a function of the number of steps equal to the gap between said holes that the drum must travel during each go-and-return stroke of the actuator.

5. A machine according to claim 1, including a second angular displacement sensor for sensing angular displacement of the drum and delivering a pulse to said computer each time a metal stud goes past the second sensor, said metal studs being mounted in uniform distribution around the periphery of a disk fixed to the shaft of said drum, the number of said studs being equal to the number of holes or to an integer multiple or submultiple thereof, and the computer being programmed to calculate the total length of hose actually wound-in since the beginning of an irrigation cycle on the basis of said pulses, and to compare periodically the ideal length which would have been wound in on the basis of the calculated ideal speeds, and if the real length is greater than the ideal length by a quantity which is greater than a threshold, the computer puts the machine on standby until the ideal length reaches the real length, whereas if the real length is less than the ideal length by a quantity greater than a determined threshold, the computer reduces the ideal cycle duration until the lateness has been absorbed.

6. A machine according to claim 3, in which the computer is programmed to calculate the ideal speed of displacement of the sprinkler apparatus by applying the formula:

$$V_t < Q/h.E$$

in which Q is the measured or calculated flow rate, E is the width of the irrigated strip as determined or calculated on the basis of the pressure at the nozzle which is itself calculated on the basis of the flow rate as measured or as calculated on the basis of the pressure measured at the inlet, and h is the desired depth of water as entered into the memory of the computer before beginning an irrigation cycle, thereby enabling said depth to be varied as a function of weather conditions or depending on the nature of the crop or the ground, and in particular making it possible to program a plurality of different depths of water along a single strip of ground irrigated in a single path of the sprinkler apparatus, and to compensate for irrigation shortfalls at the two ends of a strip if irrigated by sprinkling with a pivoting gun.

7. A machine according to claim 3, including a hydraulic stop valve which is placed on a water inlet pipe to the machine and which is controlled by an electrically-controlled pilot valve itself controlled by pulses transmitted by the said computer.

8. A machine according to claim 7, in which the computer is programmed to compare the pressure of water at the sprinkler nozzle with a minimum threshold, in order to send a close pulse to said electricalecontrolled pilot valve so as to close the stop valve if the pressure falls below said threshold, and an open pulse to said stop valve when the pressure returns above said threshold.

9. A machine according to claim 8, in which the computer is programmed to comply with a maximum irrigation duration which is entered by the user into the memory of said computer before an irrigation cycle, and in the event that the machine is momentarily stopped due to the pressure falling below said minimum threshold, the computer records the duration of said momentary stop and calculates a new ideal speed for the sprinkler apparatus such that said maximum duration is complied with.

10. A machine according to claim 9, in which a minimum quantity of water to be delivered is entered into the computer memory, and the computer calculates the quantity of water which corresponds to the new ideal speed that it has calculated, and if said quantity is less than said minimum quantity, then the computer gives priority to said minimum quantity of water.

11. A machine according to claim 1, in which the said computer is connected to a radio transmitter which transmits an alarm signal in the event of an operating anomaly in the machine.

12. A machine according to claim 1, in which the computer includes a data input terminal connected to a rain meter which delivers a signal in the event of a depth of rainfall that reaches an adjustable level, and the said computer is programmed to wind in the hose at the maximum speed or to automatically stop irrigation when it receives said signal from said rain meter.

13. A machine according to claim 1, including an anemometer which is connected to a data input terminal of said computer and which delivers said computer with a signal when the wind speed exceeds a determined threshold, and the computer is programmed to automatically stop irrigation when it receives said signal.

* * * * *